(12) United States Patent
Kobayashi et al.

(10) Patent No.: US 6,823,724 B1
(45) Date of Patent: Nov. 30, 2004

(54) METHOD AND APPARATUS FOR MEASURING VALUES OF PHYSICAL PROPERTY

(75) Inventors: Kei Kobayashi, Kyoto (JP); Hirofumi Yamada, Kyoto (JP); Kazumi Matsushige, Kyoto (JP)

(73) Assignees: JEOL Ltd., Tokyo (JP); Kyoto Instruments Co., Ltd., Kyoto (JP)

( * ) Notice: Subject to any disclaimer, the term of this patent is extended or adjusted under 35 U.S.C. 154(b) by 0 days.

(21) Appl. No.: 10/396,735

(22) Filed: Mar. 25, 2003

(51) Int. Cl.$^7$ .......................... G01B 5/28; G01N 13/12; G01N 13/16
(52) U.S. Cl. .......................... 73/105; 250/306; 250/307
(58) Field of Search .......................... 73/105; 250/306, 250/307

(56) References Cited

U.S. PATENT DOCUMENTS

| | | | | |
|---|---|---|---|---|
| 5,267,471 A | * | 12/1993 | Abraham et al. | 73/105 |
| 5,440,121 A | * | 8/1995 | Yasutake et al. | 250/306 |
| 5,760,300 A | * | 6/1998 | Kajimura | 73/105 |
| 6,097,197 A | * | 8/2000 | Matsuyama et al. | 324/750 |

OTHER PUBLICATIONS

"Capacitive–Pickup Circuitry for VideoDiscs", R.C. Palmer et al., *RCA Review*, vol. 43, Mar. 1982, pp. 194–211.
"Scanning capacitance microscopy", J.R. Matey et al., *J. Appl. Phys.* 57 (5), Mar. 1, 1985, pp. 1437–1444.
"High–resolution capacitance measurement and potentiometry by force microscopy", Yves Martin et al., *Appl. Phys. Lett.* 52 (13), Mar. 28, 1988, pp. 1103–1105.
"Scanning capacitance microscopy on a 25 nm scale", C.C. Williams et al., *Appl. Phys. Lett.* 55 (2), Jul. 10, 1989, pp. 203–205.
"Charge storage in a nitride–oxide–silicon medium by scanning capacitance microscopy", R.C. Barrett et al., *J. Appl. Phys.* 70 (5), Sep. 1, 1991, pp. 2725–2733.
"Scanning nonlinear dielectric microscope", Yasuo Cho et al., *Rev. Sci. Instrum.* 67 (6), Jun. 1996, pp. 2297–2303.

* cited by examiner

*Primary Examiner*—Daniel S. Larkin
(74) *Attorney, Agent, or Firm*—Webb Ziesenheim Logsdon Orkin & Hanson, P.C.

(57) ABSTRACT

A method of detecting the distribution of values of a physical property such as the dopant concentration of a semiconductor without being adversely affected by stray capacitance is offered. A scanning probe microscope capable of implementing this method is also offered. The method starts with applying an AC voltage of angular frequency $\omega$ between a probe and a sample from a fixed oscillator. The output from the oscillator is supplied to a piezoelectric device that drives the cantilever. The cantilever produces a deflection signal corresponding to forces corresponding to interactions between the probe and sample. A signal regarding the amplitude is extracted from the deflection signal. This signal is fed back to a means for controlling the distance between the probe and sample and supplied to a display device. As a result, an image of the surface topography of the sample is obtained. A harmonic component having a frequency higher than the triple or more of the angular frequency $\omega$ and contained in the cantilever deflection signal is extracted by a lock-in amplifier. As a result, information representing an image of differential capacitance ($\partial C/\partial V$) is obtained.

9 Claims, 14 Drawing Sheets

METHOD AND APPARATUS FOR MEASURING VALUES OF PHYSICAL PROPERTY

BACKGROUND OF THE INVENTION

1. Field of the Invention

The present invention relates to a method of measuring values of a physical property, such as capacitance C or dielectric constant ∈, by detecting the electrostatic force acting between a probe and a sample. The invention also relates to apparatus, such as a scanning probe microscope (SPM), using this method.

2. Description of the Related Art

An atomic force microscope (AFM) is one kind of scanning probe microscope (SPM) and can image specimen surfaces at atomic-scale resolution. AFM provides a basis for various SPM techniques. Normal AFM can image surface topography. A procedure for imaging the distribution of values of a physical property near a sample surface, such as electric capacitance C or dielectric constant ∈, is scanning capacitance microscopy (SCM). Two methods have been proposed to measure capacitance C by AFM. In one method, a capacitance sensor is mounted close to the probe. In the other method, electrostatic force is detected and measured.

The prior art of this method using a capacitance sensor is described. Measurement of the electric capacitance C between a probe and a sample in a microscopic region was started by Matey et al. [J. R. Matey and J. Blanc, *J. Appl. Phys.* 47, 1437 (1985)] using a capacitance sensor of an electrostatic video disk player developed by RCA for consumer applications [R. C. Palmer, E. J. Denlinger, and H. Kawamoto, RCA Rev. 43, 194 (1982)]. Matey et al. did not control the probe-sample separation. However, Williams et al. succeeded in measuring capacitance C in a microscopic region by a capacitance sensor while controlling the probe-sample separation using scanning tunneling microscopy (STM) [C. C. Williams, W. P. Hough, and S. A. Rishton, *Appl. Phys. Lett.* 55, 203(1989)]. Furthermore, Barret et al. performed measurement of electric capacitance C on a silicon oxide film that is an insulator, using AFM [R. C. Barrett and C. F. Quate, *J. Appl. Phys.* 70, 2725 (1991)]. In this way, products that are commercially available as SCM are based on an instrument where a capacitance sensor is mounted close to an AFM probe.

RCA's capacitance sensor is fitted with an oscillator oscillating at a fixed frequency. An LC resonator circuit is formed by the probe-sample capacitance C and the inductance L in the sensor. The resonant frequency of this LC resonator circuit varies. The amplitude of the output signal taken through the resonator circuit is detected using an amplitude detector. On the other hand, Cho et al. has proposed a capacitance sensor which uses a frequency variable oscillator whose oscillation frequency is varied by the probe-sample capacitance C and the inductance L in an externally attached sensor. The frequency of the output signal is detected by the use of a frequency detector [Y. Cho, A. Kirihara, and T. Saeki, *Rev. Sci. Instrum.* 67, 2297 (1996)].

With any capacitance sensor, the modulation method is used in practical operation to avoid the effects of stray capacitance. An AC electric field (alternating voltage) is applied between the probe and the sample. Amplitude or frequency modulated thereby is detected using a lock-in amplifier. Therefore, the actually obtained image is not an image of the distribution of electric capacitances C, but an image of the distribution of differential capacitances (∂C/∂V). In this method, the probe-sample separation is controlled by AFM technique. Detection of electric capacitance needs a special capacitance sensor and so the structure of the instrument is complex.

The prior art of the method by detecting electrostatic force is described. The prior art of the method using detection electrostatic force is described. Martin et al. proposed a method of detecting electric capacitance C on a sample surface using only AFM without employing a capacitance sensor [Y. Martin, D. W. Abraham, and H. K. Wickramasinghe, *Appl. Phys. Lett.* 52, 1103 (1988)]. In this method, an AC electric field E of frequency f (angular frequency ω=2πf) is applied between a probe and a sample. The electrostatic force of the second harmonic component is detected. The principle of measurement is as follows. It is assumed that the probe-sample system is made up of flat metal plates parallel to each other. Let C be the capacitance. Let the direction vertical to the parallel plates be the Z-direction. When a voltage V is applied, an electrostatic force F given by Eq. (1) acts.

$$F = -\frac{1}{2}\frac{\partial C}{\partial z}V^2 \tag{1}$$

If the voltage V applied between the probe and the sample is divided into a DC component $V_{dc}$ and an AC component $V_{ac}$, the voltage V is given by $$V = V_{dc} + V_{ac} \cos \omega t \tag{2}$$

When this voltage V is applied, the electrostatic force F is given by $$F = -\frac{1}{4}\frac{\partial C}{\partial z}(2V_{dc}^2 + 4V_{dc}V_{ac} + V_{ac}^2 + V_{ac}^2 \cos 2\omega t) \tag{3}$$

If the relation $V_{dc}=0$ is introduced, we have $$F = -\frac{1}{4}\frac{\partial C}{\partial z}(V_{ac}^2 + V_{ac}^2 \cos 2\omega t) \tag{4}$$

Since the value of $V_{ac}$ is known, the (∂C/∂z) component can be detected by detecting the second harmonic (2ω) component. That is, the values of the physical property, such as capacitance C or dielectric constant ∈, can be measured.

In this method, however, a modulation method is not used, unlike the method using a capacitance sensor. Therefore, the effects of stray capacitance cannot be neglected and the sensitivity is low.

SUMMARY OF THE INVENTION

The present invention is intended to solve the foregoing problems.

It is an object of the invention to provide a method of measuring values of a physical property, such as capacitance C or dielectric constant ∈, by detecting electrostatic force, for example, without using any special capacitance sensor.

It is another object of the invention to provide a scanning probe microscope for implementing this method.

A method of measuring values of a physical property in accordance with the present invention consists of applying an AC voltage oscillating at an angular frequency of ω between a probe and a sample to thereby induce a force oscillating at an angular frequency of n×ω (n≧3) and detecting the induced force. Thus, the values of the physical property, such as capacitance C or dielectric constant ∈, are measured.

In the conventional method using detection of an electrostatic force, a modulation method is not used as mentioned previously. Therefore, electric capacitance C is imaged instead of differential capacitance ($\partial C/\partial V$). Therefore, there are the effects of stray capacitances. In the present invention, to solve this problem, an AC voltage V of angular frequency of ω is applied between the probe and the sample. In this case, it is assumed that the probe-sample system consists of flat metal plates parallel to each other and has an electric capacitance of C. Let the z-axis vertical to the parallel plates. The component $\partial C/\partial z$ is not constant, but is modulated by the applied voltage V and so we consider that the component $\partial C/\partial z$ is modulated by the angular frequency ω as given by $$\frac{\partial C(V, z)}{\partial z} = \frac{\partial C(V_{dc}, z)}{\partial z} + \frac{\partial^2 C(V_{dc}, z)}{\partial V \partial z} V_{ac}\cos\omega t \quad (5)$$

Therefore, the electrostatic force is given by $$F = -\frac{1}{4}\left(\frac{\partial C(V_{dc}, z)}{\partial z} + \frac{\partial^2 C(V_{dc}, z)}{\partial V \partial z} V_{ac}\cos\omega t\right)(V_{ac}^2 + V_{ac}^2\cos 2\omega t) \quad (6)$$

This can be varied to:

$$F = -\frac{1}{4}\left[\frac{\partial C(V_{dc}, z)}{\partial z} V_{ac}^2 + \frac{\partial^2 C(V_{dc}, z)}{\partial V \partial z} V_{ac}^3\cos\omega t + \frac{\partial C(V_{dc}, z)}{\partial z} V_{ac}^2\cos 2\omega t + \frac{1}{2}\frac{\partial^2 C(V_{dc}, z)}{\partial V \partial z} V_{ac}^3(\cos 3\omega t + \cos\omega t)\right] \quad (7)$$

Accordingly, there exists the third harmonic (3ω) component given by $$F = -\frac{1}{8}\left(\frac{\partial^2 C(V_{dc}, z)}{\partial V \partial z} V_{ac}^3\cos 3\omega t\right) \quad (8)$$

Therefore, information corresponding to an image of differential capacitance ($\partial C/\partial V$) can be obtained by detecting the third harmonic (3ω) component.

The measuring apparatus according to the present invention is designed to measure values of a physical property of a sample by placing a probe and the sample close to or in contact with each other and characterized in that the apparatus includes at least one oscillator for applying an AC voltage of angular frequency ω between the probe and sample, force detection means for detecting a force produced by interaction between the probe and sample, and harmonic component extraction means for extracting a harmonic component n×ω (n≧3) contained in the output from the force detection means.

Other objects and features of the invention will appear in the course of the description thereof, which follows.

DETAILED DESCRIPTION OF THE INVENTION

Figure 1:
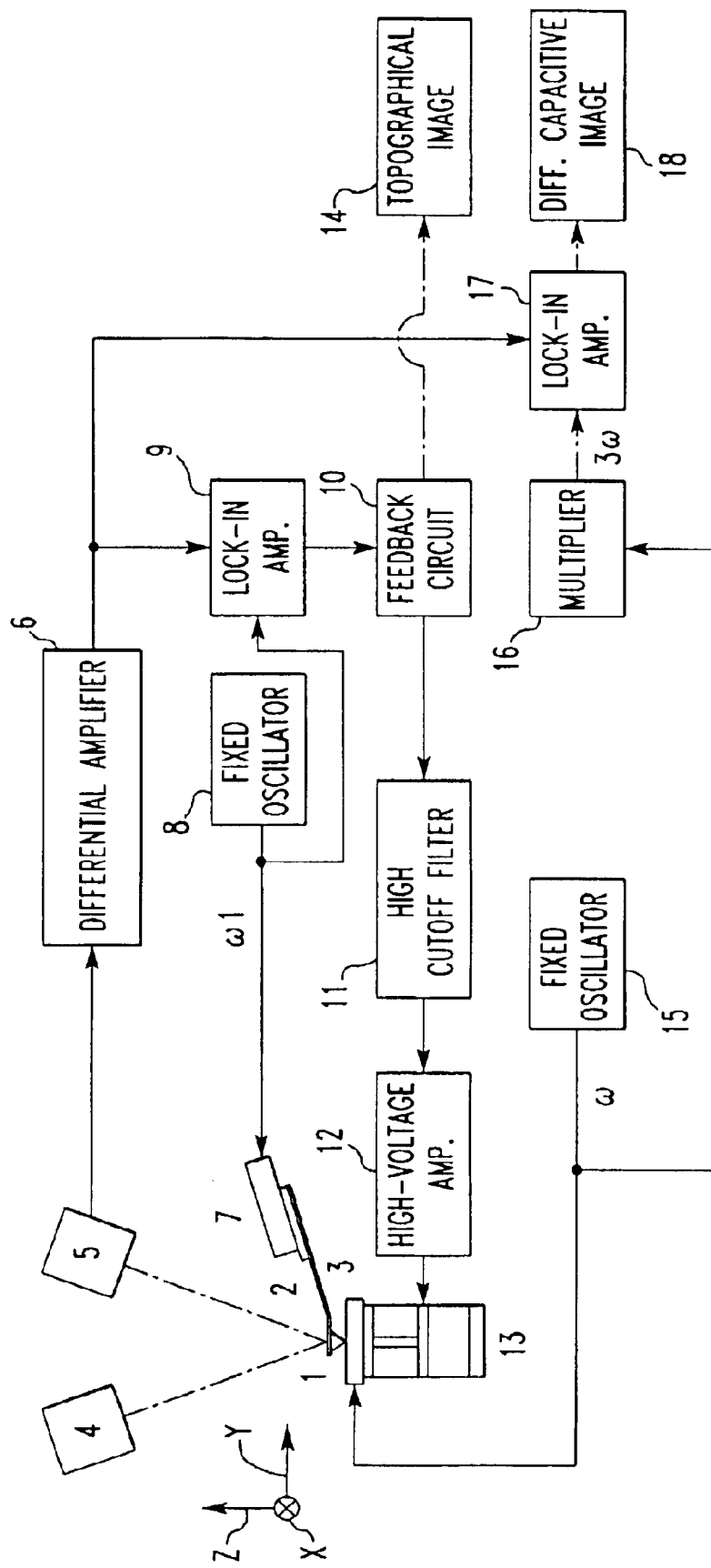
FIG. 1 is a block diagram of a measuring apparatus according to one embodiment of the present invention.

FIG. 1 is a block diagram of a dynamic mode AFM embodying the concept of the present invention, the dynamic mode AFM being one kind of scanning probe microscope. This instrument includes a cantilever 2 having a probe 1. Deflection of the cantilever 2 can be detected by a deflection sensor consisting of a laser diode 4, a pair of photodiodes 5, and a differential amplifier 6. A signal having an angular frequency of ω1 is applied from a fixed oscillator 8 to a piezoelectric device 7 that is a drive means. Thus, the cantilever 2 and fitted with the probe 1 can be excited into oscillation.

The output signal from the deflection sensor includes an oscillatory component synchronized with the angular frequency ω1 of the fixed oscillator 8. The amplitude of this oscillatory component corresponds to the force produced by the interaction between the probe 1 and the sample 3. This amplitude can be detected by converting it into a voltage, using a lock-in amplifier 9 to which a signal of the angular frequency ω1 is supplied as a reference signal. When the probe 1 comes sufficiently close to the sample 3, the probe receives the aforementioned force and the amplitude decreases. This amplitude can be maintained constant by adjusting the Z position of the sample by feeding the output from the lock-in amplifier 9 back to an XYZ drive mechanism 13 via a feedback circuit 10, the drive mechanism 13 using a piezoelectric device that is driven via a high cutoff filter 11 and a high-voltage amplifier 12.

The scanning probe microscope shown in this FIG. 1 is an atomic force microscope (AFM). The cantilever 2 has the probe 1 at its front end and is oscillated toward and away from the sample 3 at the angular frequency ω1 of the fixed oscillator 8 by the drive means achieved by the piezoelectric device 7. Light from the laser diode 4 is shot at the rear surface of the cantilever 2. The reflected light is received by the photodiodes 5 that are light-receiving devices. The outputs from the photodiodes 5 are supplied to the differential amplifier 6, which in turn produces a signal indicative of periodic deflection of the cantilever 2. This signal is fed to the lock-in amplifier 9.

The Z position of the sample (i.e., the position taken in the up-and-down direction (Z-direction) as viewed in FIG. 1) that varies according to the topography of the top surface of the sample 3 is adjusted by the XYZ drive mechanism 13 while scanning the probe across the surface of the sample 3 within the XY-plane that is a virtual plane vertical to the plane of FIG. 1. A straight virtual line connecting the probe 1 and sample 3 extends along the Z-direction. The output from the lock-in amplifier 9 corresponds to the force owing to the interaction between the probe 1 and the sample 3. The output from the feedback circuit 10 is such that a voltage corresponding to this force assumes a predetermined value. The drive mechanism 13 moves the sample in the Z-direction according to the output from the feedback circuit 10. A control voltage that is supplied from the feedback circuit 10 for driving the probe in the Z-direction is supplied to a display device. As a result, a topographic image 14 of the surface can be displayed.

An AC voltage of angular frequency ω from the fixed oscillator 15 is applied between the probe 1 and the sample 3 (i.e., between the sample 3 and ground). A reference signal Vref is produced by tripling the angular frequency ω using a multiplier 16. The third harmonic (3ω) component of the electrostatic force is detected in synchronism with the reference signal Vref. Consequently, an image 18 of differential capacitance ($\partial C/\partial V$) is obtained. In particular, the lock-in amplifier 17 extracts the component synchronized with the reference signal Vref from the deflection output from the differential amplifier 6 and supplies the extracted component to the display device, thus producing the differential capacitance image 18. The combination of the multiplier 16 and lock-in amplifier 17 used in the present embodiment can be replaced by a bandpass filter that passes the component of angular frequency 3ω.

Figure 2:
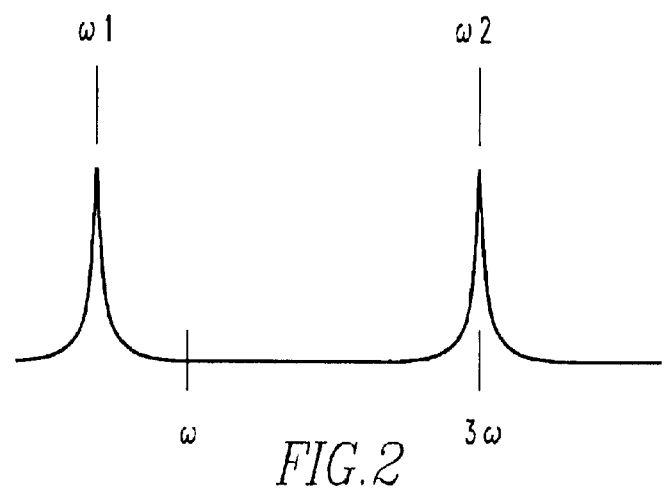
FIG. 2 is a spectrum showing the positions of the first and second harmonic angular frequencies of free resonance of a cantilever 2 in the form of a short strip included in the apparatus shown in FIG. 1.

FIG. 2 is a spectrum illustrating angular frequencies used in the embodiment illustrated in FIG. 1. As can be seen from FIG. 2, the mechanical resonator portion including the probe 1 and cantilever 2 has a resonant frequency at which the amplitude is boosted greatly by a resonance phenomenon. In the dynamic mode, the frequency of the fixed oscillator 8 is set to the first harmonic angular frequency (ω1) (also known as the fundamental angular frequency) of free resonance of the cantilever 2. The oscillations of the cantilever 2 induced by electrostatic force are amplified greatly by a resonance phenomenon by setting the angular frequency ω in such a way that 3ω is coincident with the second harmonic angular frequency ω2 of free resonance of the cantilever 2. In consequence, values of a physical property can be measured with high sensitivity.

As an example, it is assumed that the cantilever 2 assumes the form of a short strip, the first harmonic angular frequency ω1 of free resonance is 30 kHz, and the second harmonic angular frequency ω2 is 189 kHz. In this case, an image of differential capacitance (ωC/ωV) is derived by setting the angular frequency ω to 63 kHz, detecting variations in the amplitude and the phase of the cantilever oscillation by using the lock-in amplifier 17, and supplying the output signal from the amplifier 17 to the display device. The reference signal of 189 kHz phase-synchronized to the angular frequency ω is supplied to the lock-in amplifier 17.

Figure 3:
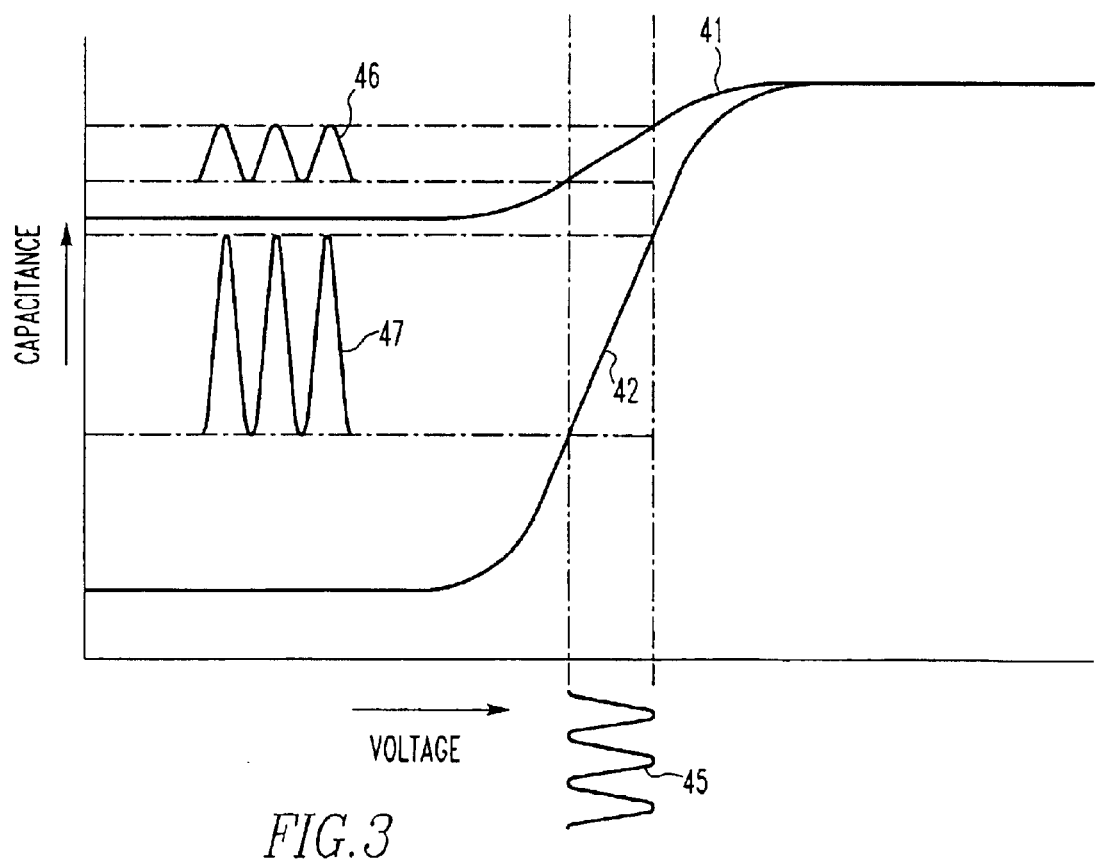
FIG. 3 is a graph showing variations in the capacitance of the apparatus shown in FIG. 1 in a case where the probe 1 is placed at ground potential and a voltage is applied to a sample 3 that is a p-type semiconductor.

FIG. 3 is a graph showing variations in the capacitance of the embodiment illustrated in FIGS. 1 and 2 in a case where the probe 1 is placed at ground potential and voltage V is applied from the fixed oscillator 15 to the sample 3 that is a p-type semiconductor of Si. The bold line 41 indicates a case where the sample 3 is heavily doped. The thin line 42 indicates a case where the sample is lightly doped. The capacitance C increases when the voltage V applied to the sample 3 swings to the positive voltage side and decreases when the voltage V swings to the negative voltage side. That is, the sign of differential capacitance ($\partial C/\partial V$) is positive. The dopant concentration can be known from the magnitude of the absolute value of $|\partial C/\partial V|$.

Figure 4:
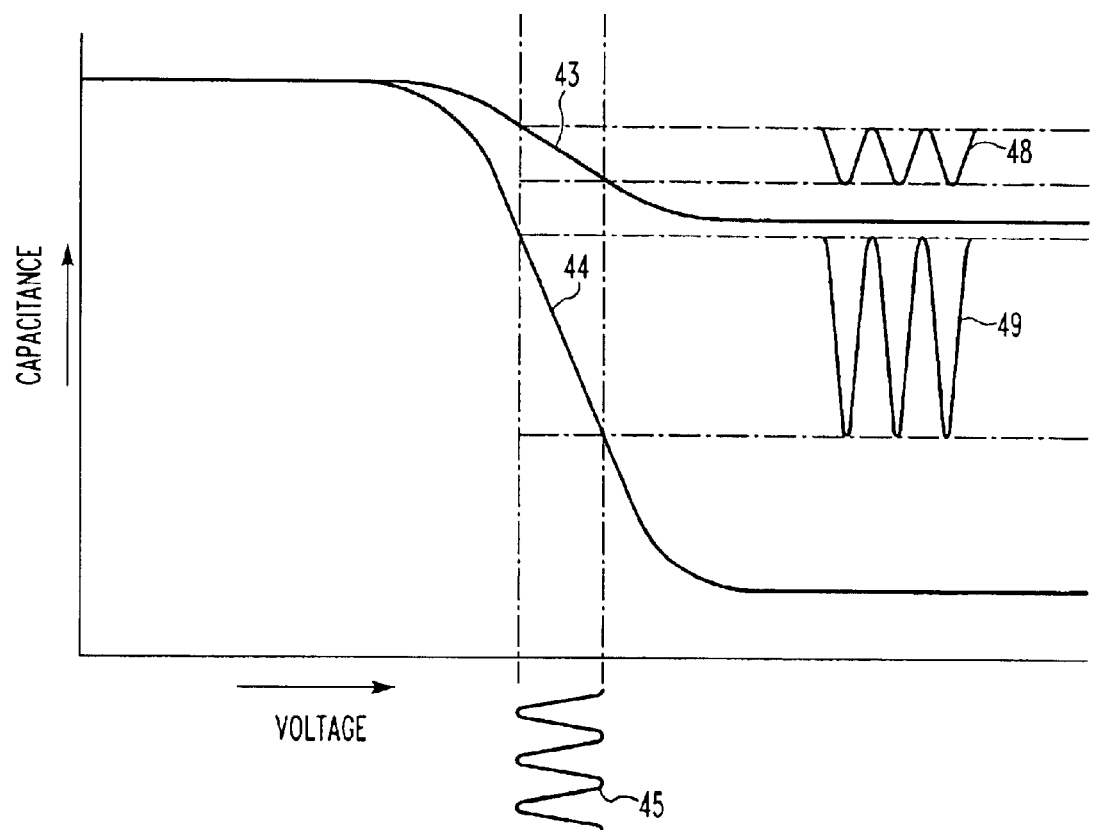
FIG. 4 is a graph similar to FIG. 3, but in which the sample 3 is an n-type semiconductor.

FIG. 4 is a graph showing variations in the capacitance of the embodiment illustrated in FIG. 1 in a case where the probe 1 is placed at ground potential and voltage V is applied from the fixed oscillator 15 to the sample 3 that is an n-type semiconductor of Si. The bold line 43 indicates a case where the sample 3 is heavily doped. The thin line 44 indicates a case where the sample is lightly doped. The capacitance C decreases when the voltage V applied to the sample 3 swings to the positive voltage side and increases when the voltage V swings to the negative voltage side. That is, the sign of differential capacitance ($\partial C/\partial V$) is negative. The dopant concentration can be known from the magnitude of the absolute value of $|\partial C/\partial V|$.

In FIGS. 3 and 4, when signal 45 of the angular frequency ω is applied from the fixed oscillator 15 between the probe 1 and the sample 3 as mentioned previously, the phase characteristics of the amplitudes of the waveforms 46, 47, 48, and 49 that are third harmonic (3ω) components of the lock-in amplifier 17 are detected. The dopant concentration of the sample 3 that is dependent on the amplitudes can be detected.

The sample 3 is a Si semiconductor as mentioned previously. $SiO_2$ is formed on the surface. Images 14 and 18 are displayed by the display device that is achieved by a liqud-crystal display or CRT. The display device may be hereinafter indicated by these reference numerals 14 and 18. Reference numerals 25 and 36 may also be used later for the same purpose.

Figure 5:
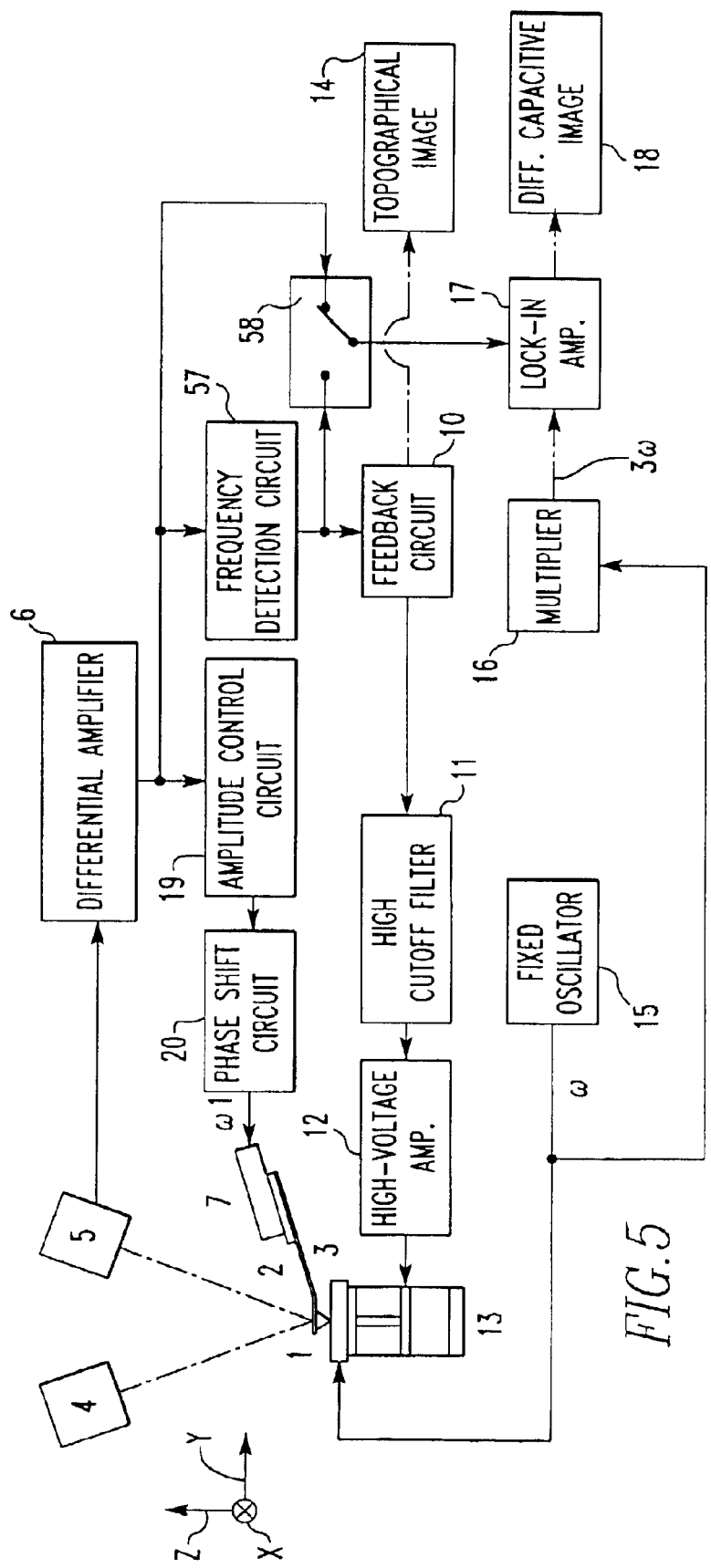
FIG. 5 is a block diagram of a measuring apparatus according to a further embodiment of the invention.

FIG. 5 is a block diagram of another dynamic mode AFM to which the present invention is applied. It is to be noted that those components which correspond to their respective counterparts of the embodiment of FIG. 1 are indicated by the same reference numerals as in FIG. 1. Deflection of the cantilever 2 fitted with the probe 1 can be detected by the deflection sensor consisting of laser diode 4, photodiodes 5, and differential amplifier 6. The output signal from the differential amplifier 6 indicates the deflection of the cantilever 2, and is amplified or attenuated in amplitude by an amplitude control circuit 19. The piezoelectric device 7 is again driven by a phase shift circuit 20. Thus, a self-oscillating loop, in a sense, can be formed. Oscillation at the first harmonic angular frequency ω1 of free resonance of the cantilever 2 is sustained. The first harmonic angular frequency ω1 varies according to the force owing to the interaction between the probe 1 and the sample 3. Variations in the frequency can be detected by converting the frequency in to a voltage using a frequency detection circuit 57. When the probe 1 comes sufficiently close to the sample 3, an attractive force reduces the angular frequency ω1, while a repulsive force increases it. The output from the frequency detection circuit 57 is fed back to the XYZ drive mechanism 13 via the feedback circuit 10. The drive mechanism 13 uses the piezoelectric device that is driven through the high cutoff filter 11 and high-voltage amplifier 12. Consequently, the Z position of the sample can be so adjusted that the output from the frequency detection circuit 57 is kept at a predetermined value.

The output from the differential amplifier 6 is fed to the frequency detection circuit 57 consisting of a phase-locked loop circuit. The Z position of the sample (i.e., the position taken in the up-and-down direction (Z-direction) as viewed in FIG. 1) that varies according to the topography of the top surface of the sample 3 is adjusted by the XYZ drive mechanism 13 while scanning the probe across the surface of the sample 3 in the X- and Y-directions within a virtual plane vertical to the plane of FIG. 1. A straight virtual line connecting the probe 1 and sample 3 extends along the Z-direction. The output from the frequency detection circuit 57 corresponds to the force owing to the interaction between the probe 1 and the sample 3. The output from the feedback circuit 10 is such that a voltage corresponding to this force assumes a predetermined value. The drive mechanism 13 adjusts the Z position of the sample according to the output from the feedback circuit 10. A control voltage that is supplied from the feedback circuit 10 for driving the probe in the Z-direction is supplied to the display device. As a result, a topographic image 14 of the surface is displayed.

An AC voltage of angular frequency ω from the fixed oscillator 15 is applied between the probe 1 and the sample 3. A reference signal Vref is produced by tripling the angular frequency ω using the multiplier 16. The third harmonic (3ω) component of the electrostatic force synchronized with the reference signal Vref is detected using the lock-in amplifier 17. Consequently, an image 18 of differential capacitance ($\partial C/\partial V$) is obtained. In particular, the lock-in amplifier 17 extracts the output component synchronized with the reference signal Vref either from the output from the differential amplifier 6 or from the output from the frequency detection circuit 57 and supplies the extracted component to the display device, thus producing the differential capacitance image 18. The combination of the multiplier 16 and lock-in amplifier 17 used in the present embodiment can be replaced by a bandpass filter that passes the component of the angular frequency 3ω.

The signal supplied to the lock-in amplifier 17 to extract the component of the angular frequency 3ω can be switched between the output from the differential amplifier 6 and the output from the frequency detection circuit 57. When the switch 58 is connected to the side of the differential amplifier 6, the same configuration as the embodiment of FIG. 1 is obtained. Therefore, oscillations of the cantilever due to electrostatic force are amplified greatly by a resonance phenomenon by setting the angular frequency ω in such a way that 3ω is coincident with the angular frequency of the second harmonic component ω2 of free resonance in the same way as in FIG. 1. Consequently, measurement of values of a physical property at high sensitivity is performed.

Since the output from the frequency detection circuit 57 corresponds to the force owing to the interaction between the probe 1 and the sample 3, an image 18 of differential capacitance ($\partial C/\partial V$) can also be obtained by connecting the switch 58 to the side of the frequency detection circuit 57 and detecting the third harmonic (3ω) component contained in the output from the frequency detection circuit 57, using the lock-in amplifier 17. At this time, the Z position of the sample is so controlled that the output from the frequency detection circuit 57 assumes a preset value by feeding the output from the frequency detection circuit 57 back to the XYZ drive mechanism 13 using the piezoelectric device driven through the high cutoff filter 11 and high voltage amplifier 12 using the feedback circuit 10. Since the response band of this control of distance is about 1 kHz, it is necessary to set the angular frequency ω to above about 1 kHz in order to prevent crosstalk and to obtain a correct image 14 of the surface topography. The frequency detection response band of the frequency detection circuit 57 is usually about 10 kHz. It is necessary to set the angular frequency ω such that 3ω is about below 10 kHz.

In this atomic force microscope, the output signal from the differential amplifier 6 that is a signal indicative of the deflection of the cantilever 2 is delayed in phase by 90° with respect to the signal that controllably drives the piezoelectric device 7. The output signal from the differential amplifier 6 is amplified or attenuated in amplitude by the amplitude control circuit 19 and supplied to the phase shift circuit 20 as mentioned previously. The phase is delayed by 90° and inverted in this phase shift circuit 20. As a result, the signal from the phase shift circuit 20 is positively fed back to the piezoelectric device 7. Therefore, the mechanical oscillation of the cantilever 2 continues. The frequency detection circuit 57 produces a voltage corresponding to the output frequency of the differential amplifier 6.

Figure 6:
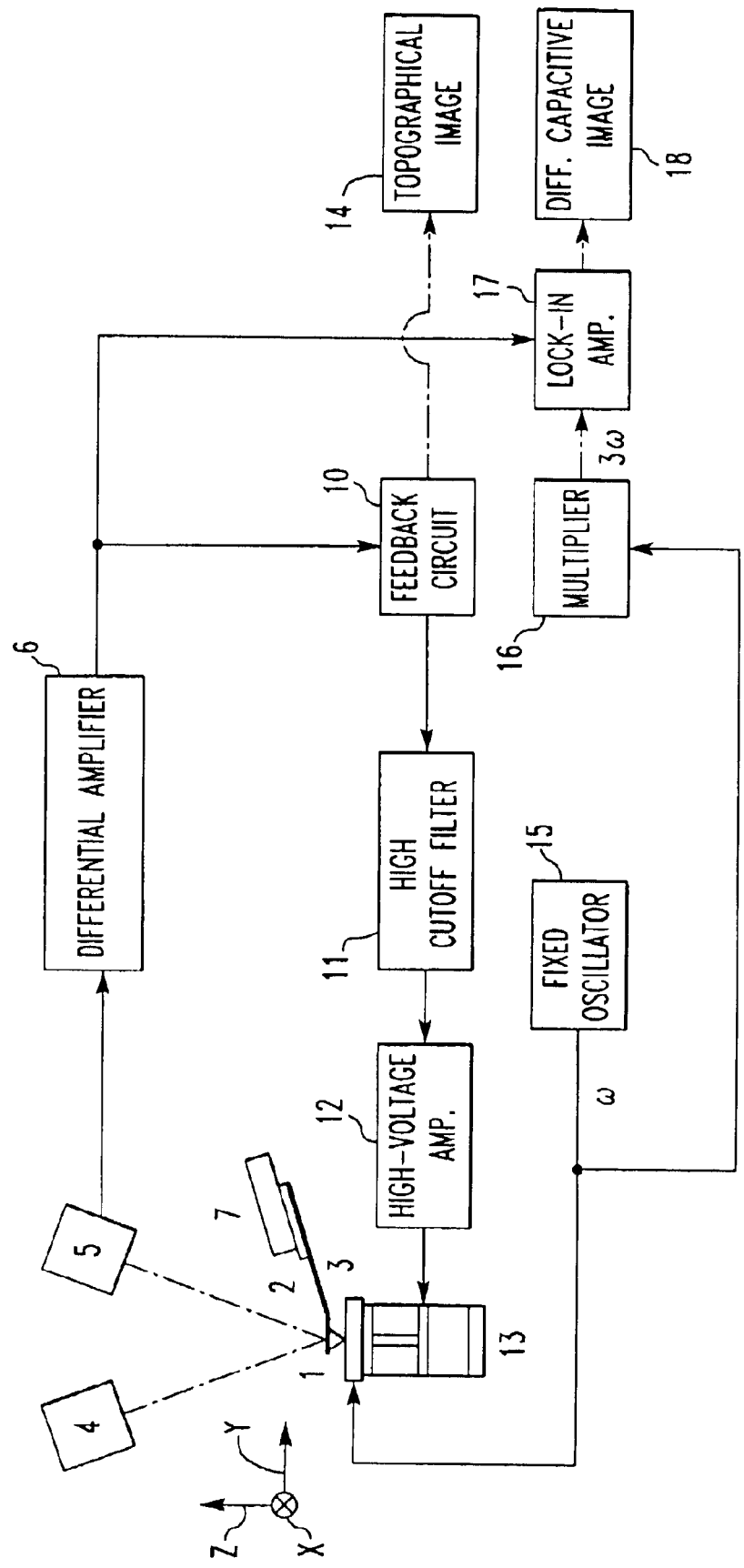
FIG. 6 is a block diagram of a contact mode AFM according to a still other embodiment of the invention.

FIG. 6 is a block diagram of a contact mode AFM embodying the concept of the invention. Those components which correspond to their respective counterparts of FIG. 1 are denoted by the same reference numerals as in FIG. 1. In the present embodiment, the piezoelectric device 7 shown in FIG. 1 is omitted. The base end of the cantilever 2 is fixedly mounted to a stationary position. In this embodiment, the probe 1 is kept in contact with the surface of the specimen 3. Deflection of the cantilever 2 fitted with the probe 1 can be detected by a deflection sensor consisting of laser diode 4, photodiodes 5, and differential amplifier 6. While the probe 1 is scanned on the sample 3, deflection of the cantilever 2 is detected by this deflection sensor. The output from this deflection sensor is fed back to the XYZ drive mechanism 13 driven through the high cutoff filter 11 and high voltage amplifier 12 using the feedback circuit 10. The deflection can be maintained constant by adjusting the Z position of the sample. A topographic image 14 of the surface can be displayed by scanning the probe in the X- and Y-directions by the XYZ drive piezoelectric device 13, simultaneously adjusting the Z position of the sample 3 according to the topography of the sample, and supplying a Z-drive control voltage to the display device from the feedback circuit 10.

An AC voltage of angular frequency ω from the fixed oscillator 15 is applied between the probe 1 and the sample 3. A reference signal Vref is produced by tripling the angular frequency o using the multiplier 16. The third harmonic (3ω) component of the electrostatic force synchronized with the reference signal Vref is detected using the lock-in amplifier 17. Consequently, an image 18 of differential capacitance ($\partial C/\partial V$) is obtained. In particular, the lock-in amplifier 17 extracts the component synchronized with the reference signal Vref from the deflection output from the differential amplifier 6 and supplies the extracted component to the display device, thus producing the differential capacitance image 18. The combination of the multiplier 16 and lock-in amplifier 17 used in the present embodiment can be replaced by a bandpass filter that passes the component of the angular frequency 3ω.

Figure 7:
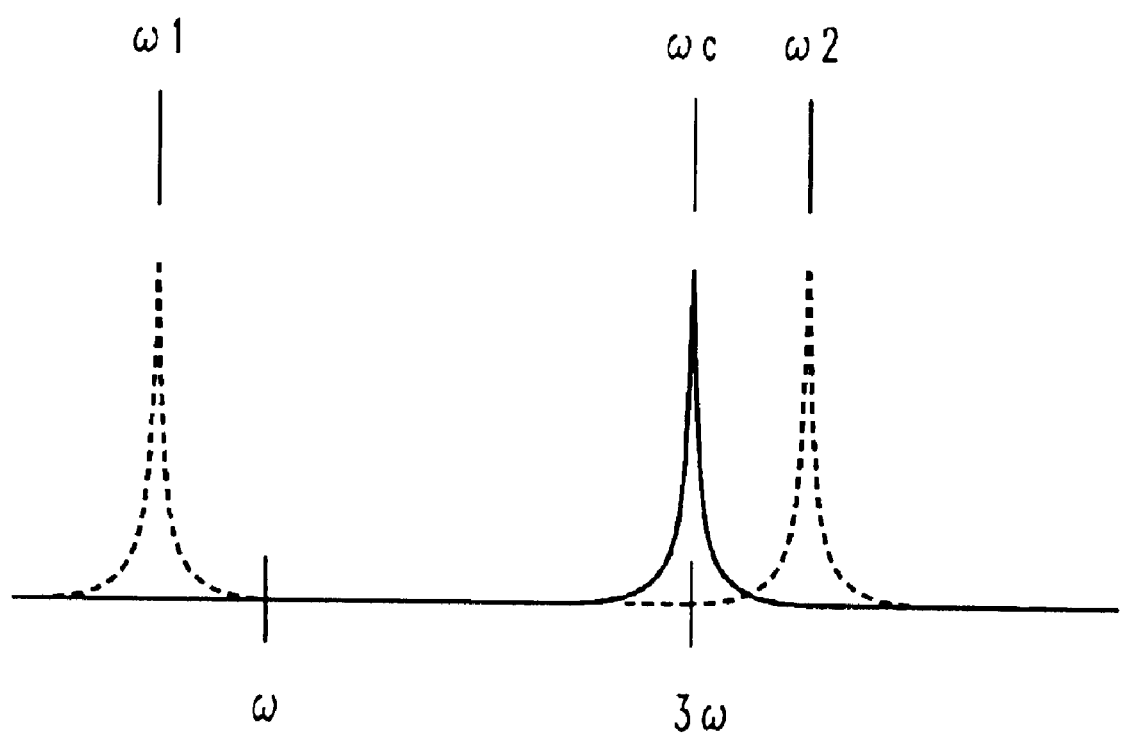
FIG. 7 is a spectrum showing the positions of the first and second harmonic angular frequencies of free resonance of the cantilever 2 in the form of a short strip included in the apparatus shown in FIG. 5.

FIG. 7 is a spectrum illustrating angular frequencies used in the embodiment illustrated in FIG. 6. As can be seen from this FIG. 7, when the probe 1 is in contact with the surface of the sample 3, the mechanical resonator portion including the probe 1 and cantilever 2 has a contact resonant angular frequency ωc determined by the interaction between the probe 1 and the sample 3. Therefore, oscillations of the cantilever 2 due to electrostatic force are greatly amplified by a resonance phenomenon by setting the angular frequency ω of the fixed oscillator 15 in such a way that 3ω is coincident with the contact resonant angular frequency ωc. Hence, the values of a physical property can be measured with high sensitivity.

Figure 8:
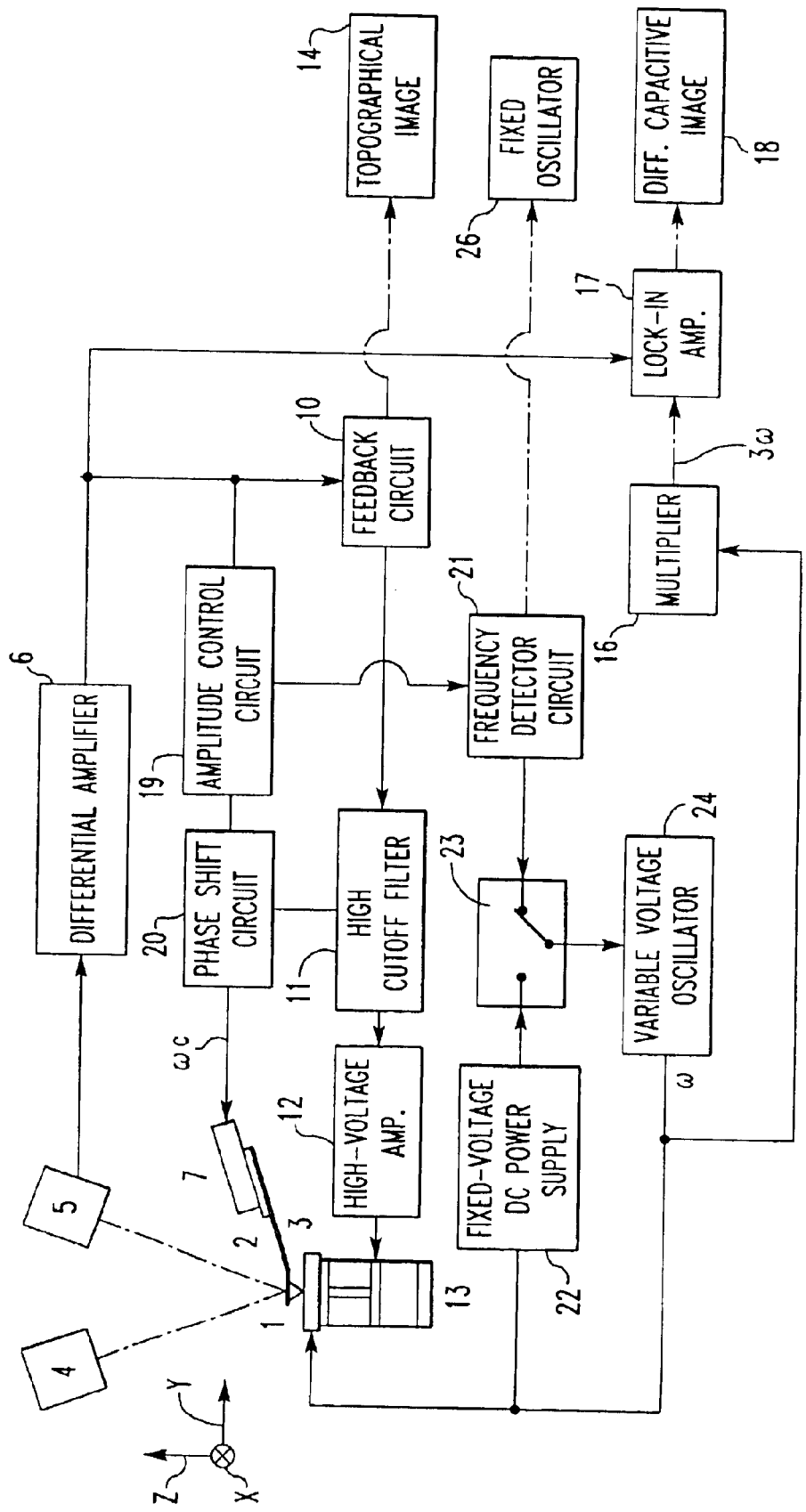
FIG. 8 is a block diagram of a measuring apparatus according to a still further embodiment of the invention.

FIG. 8 is a block diagram of a contact mode AFM according to a still other embodiment of the invention. It is to be noted that those components which correspond to their respective counterparts of the embodiments of FIGS. 1 and 5 are indicated by the same reference numerals as in FIGS. 1 and 5. The probe 1 is kept in contact with the surface of the specimen 3. Deflection of the cantilever 2 fitted with the probe 1 can be detected by a deflection sensor consisting of laser diode 4, photodiodes 5, and differential amplifier 6. When the probe 1 touches the sample 3, deflection of the cantilever 2 is detected by this deflection sensor. The output from this deflection sensor is fed back to the XYZ drive mechanism 13 driven through the high cutoff filter 11 and high voltage amplifier 12 using the feedback circuit 10. The deflection can be maintained constant by adjusting the Z position of the sample in such a way that the output from the differential amplifier 6 assumes a preset value. A topographic image 14 of the surface can be displayed by scanning the sample relative to the probe in the X- and Y-directions by the XYZ drive piezoelectric device 13, simultaneously adjusting the Z position of the sample 3 according to the topography of the sample, and supplying a Z-drive control voltage obtained at this time from the feedback circuit 10 to the display device.

Because the contact resonance frequency is determined by the interaction between the probe 1 and the sample 3, this frequency varies depending on the state of contact between the probe and sample, on the elastic constant of the sample surface, and on the undersurface structure. The output signal from the differential amplifier 6 indicates deflection of the cantilever 2, and is amplified or attenuated in amplitude by the amplitude control circuit 19. The piezoelectric device 7 is a gain driven by the phase shift circuit 20. Thus, a self-oscillating loop, in a sense, can be formed. In this case, if the contact resonance frequency of the cantilever 2 varies, it can be maintained in oscillation at the contact resonance frequency at all times. Therefore, a voltage corresponding to variations in the contact resonance frequency of the cantilever 2 can be obtained by the frequency detection circuit 21 that is accomplished by a phase-locked loop, for example. At this time, the variations in this voltage are supplied to the display device and imaged as a contact resonant frequency image 25. In this way, information about the elastic constant of the sample surface and the under surface structure can be derived.

When a voltage control switch 23 for a voltage variable oscillator 24 is switched to the side of a fixed-voltage DC power supply 22, the oscillator 24 can be controlled by the fixed-voltage DC power supply 22 that produces a constant preset DC voltage. An AC voltage of the obtained constant angular frequency ω can be applied between the probe 1 and the sample 3. The output from the voltage variable oscillator 24 is supplied to the multiplier 16. A reference signal having a frequency that is the triple of the angular frequency ω is obtained. This reference signal is fed to the lock-in amplifier 17. In consequence, the third harmonic (3ω) component of electrostatic force synchronized to this reference signal can be detected. The resulting signal is supplied to the display device. In this way, an image 18 of differential capacitance (∂C/∂V) is obtained. The combination of the multiplier 16 and lock-in amplifier 17 used in the present embodiment can be replaced by a bandpass filter that passes the component of the angular frequency 3ω.

When the voltage control switch 23 for the voltage controlled oscillator 24 is switched to the side of the frequency detection circuit 21, the oscillation frequency of the voltage controlled oscillator 24 can be dynamically controlled corresponding to the variations in the contact resonance frequency detected by the frequency detection circuit 21. An AC voltage of the obtained variable angular frequency ω of is applied between the probe 1 and sample 3. Consequently, the third harmonic frequency (3ω) of the angular frequency ω can be brought into coincidence with the contact resonance frequency of the cantilever 2. The third harmonic (3ω) component of electrostatic force can be obtained as the output from the lock-in amplifier 17. In consequence, the stability of the measurement of the values of a physical property of the sample 3 can be enhanced.

In this atomic force microscope, the output signal from the differential amplifier 6 that is a signal indicative of the deflection of the cantilever 2 is delayed in phase by 90° with respect to the signal that controllably drives the piezoelectric device 7. The output signal from the differential amplifier 6 is amplified or attenuated in amplitude by the amplitude control circuit 19 and supplied to the phase shift circuit 20 as mentioned previously. The phase is delayed by 90° and inverted in this phase shift circuit 20. As a result, the signal from the phase shift circuit 20 is positively fed back to the piezoelectric device 7. Therefore, the mechanical oscillation of the cantilever 2 continues. The frequency detection circuit 21 produces a voltage corresponding to the output frequency of an amplifier circuit 19.

Figure 9:
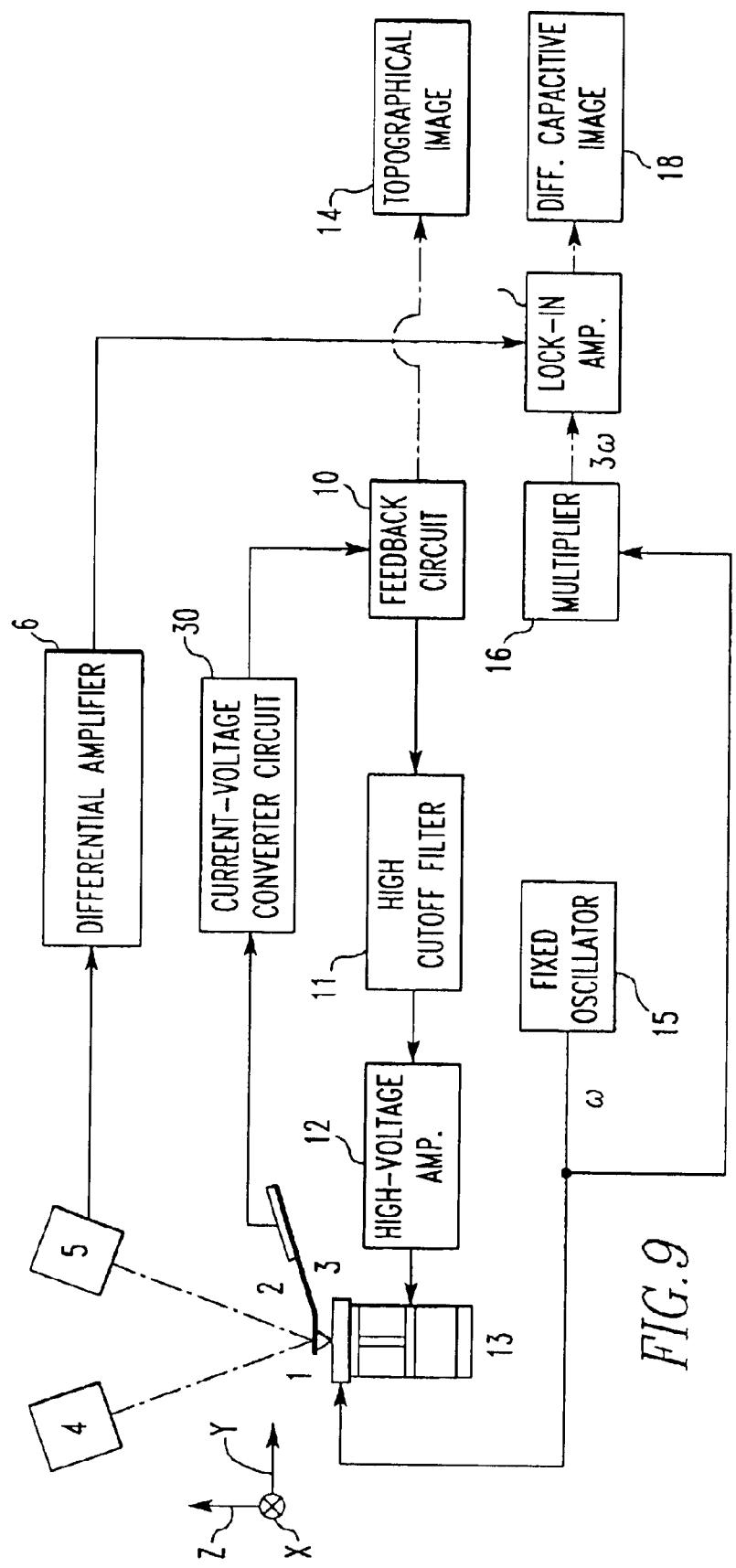
FIG. 9 is a block diagram of a measuring apparatus according to a yet other embodiment of the invention.

FIG. 9 is a block diagram showing a measuring apparatus according to a yet other embodiment of the invention. The present embodiment is similar to the embodiment of FIG. 1, and those components which correspond to their respective counterparts of FIG. 1 are indicated by the same reference numerals as in FIG. 1. In the present invention, the interaction between the probe 1 and the sample 3 is maintained constant by maintaining constant the tunneling current flowing between the probe 1 and sample 3. As a DC voltage is applied between the sample and probe, a tunneling current flows from the sample 3 to the cantilever 2 fitted with the probe 1. This current is detected by a current-voltage converter circuit 30 and fed back to the XYZ drive mechanism 13 via feedback circuit 10, high cutoff filter 11, and high-voltage amplifier 12. Thus, the Z position of the sample is controlled. As a result, the tunneling current can be maintained at a preset constant value. When the sample is scanned relative to the probe by the XYZ drive mechanism 13, the Z position of the sample 3 is adjusted according to the topography of the sample 3. The control voltage that is supplied from the feedback circuit 10 for driving the sample in the Z direction is fed to the display device. As a result, a topographic image 14 based on the tunneling current can be displayed. In this embodiment of FIG. 9, the piezoelectric device 7 used in the embodiment of FIG. 1 is omitted. The base end of the cantilever 2 is fixedly mounted to a stationary position.

In the present embodiment, an AC voltage of the angular frequency ω is applied between the probe 1 and sample 3 from the fixed oscillator 15 when the Z position of the sample 3 is controlled according to the tunneling current as mentioned previously. Interaction between the probe and sample which is induced by the AC voltage deflects the cantilever 2. The output signal from the differential amplifier 6 that is a signal indicative of the deflection is supplied to the lock-in amplifier 17, which is supplied with a reference signal obtained by tripling the angular frequency ω using the multiplier 16. As a result, the third harmonic (3ω) component of electrostatic force synchronized to the reference signal is detected. The resulting signal is supplied to the display device. Consequently, an image 18 of differential capacitance (∂C/∂V) is obtained. The combination of the multiplier 16 and lock-in amplifier 17 used in the present embodiment can be replaced by a bandpass filter that passes the component of the angular frequency 3ω.

Furthermore, the angular frequency ω is so set that 3ω is coincident with the first harmonic angular frequency (ω1) of the free resonance (ω1=3ω). Oscillations of the cantilever due to electrostatic force are amplified greatly by a resonance phenomenon. Therefore, the values of a physical property can be measured with high sensitivity.

Figure 10:
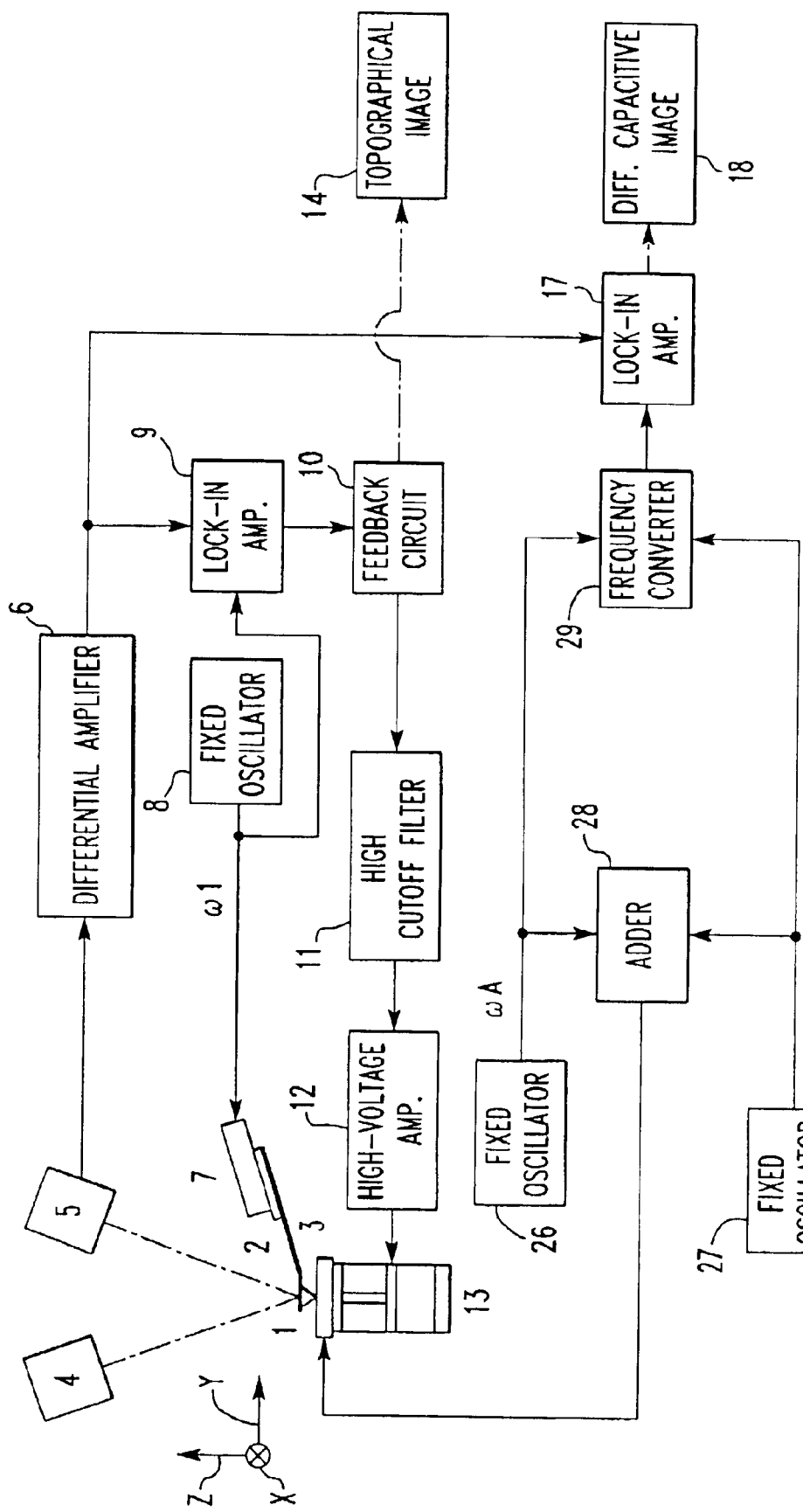
FIG. 10 is a block diagram of a measuring apparatus according to an additional embodiment of the invention.

FIG. 10 is a block diagram of a measuring apparatus according a yet other embodiment of the invention. This embodiment provides an example of structure of dynamic mode AFM. This embodiment is similar to the embodiment of FIG. 1, and those components which correspond to their respective counterparts of FIG. 1 are indicated by the same reference numerals as in FIG. 1. In the present embodiment, plural AC voltages having different angular frequency components ωA and ωB (where ωA>ωB) are simultaneously applied between the probe 1 and sample 3, inducing forces oscillating at angular frequencies |(m−n)×ωA±n×ωB|(m>n), where n and m are natural numbers. These forces are detected.

Fixed oscillators 26 and 27 produce angular frequencies ωA and ωB, respectively. Signals of these angular frequencies ωA and ωB are denoted by $V_A \cos \omega_A t$ and $V_B \cos \omega_B t$, respectively. These are added up by an adder 28, resulting in signal V given by $$V = V_A \cos \omega_A t + V_B \cos \omega_B t \quad (9)$$

$$F = -\frac{1}{2}\frac{\partial C}{\partial z}(V_A \cos \omega_A t + V_B \cos \omega_B t)^2 \quad (10)$$

$$= -\frac{1}{4}\frac{\partial C}{\partial z}[V_A^2 + V_A^2 \cos 2\omega_A t + V_B^2 + V_B^2 \cos 2\omega_B t +$$

$$V_A V_B \cos(\omega_A + \omega_B)t + V_A V_B \cos(\omega_A - \omega_B)t]$$

Since the above relations hold, in a case where ∂C/∂z can be regarded as constant with respect to z, when a voltage of a single angular frequency ω is applied, a frequency component of (ωA+ωB) or (ωA−ωB) may be detected by the lock-in amplifier 17 instead of measuring the second harmonic. Since $V_A$ and $V_B$ are known, ∂C/∂z can be detected.

Furthermore, in a case where ∂C/∂z is not constant but is modulated by the applied voltage V, we have $$\frac{\partial C(V, z)}{\partial z} = \frac{\partial C(V_{dc}, z)}{\partial z} + \quad (11)$$

$$\frac{\partial^2 C(V_{dc}, z)}{\partial V \partial z}(V_A \cos \omega_A t + V_B \cos \omega_B t)$$

Therefore, in a case where a voltage of a single angular frequency ω is applied, any one of four frequencies |ωA+(ωA+ωB)|, |ωB+(ωA+ωB)|, |ωA+(ωA−ωB)|, and |ωB−(ωA−ωB)| (i.e., 2ωA±ωB and |ωA±2ωB|) is detected by the lock-in amplifier 17 instead of a measurement where the third harmonic is detected.

In FIG. 10, deflection of the cantilever 2 fitted with the probe 1 can be detected by a deflection sensor consisting of a laser diode 4, a pair of photodiodes 5, and a differential amplifier 6. A signal from a fixed oscillator 8 is applied to a piezoelectric device 7 to excite the cantilever 2 into oscillation, the cantilever 2 being fitted with the probe 1.

The amplitude of the oscillatory component synchronized to the angular frequency ω1 of the fixed oscillator 8 can be converted into a voltage and detected using the lock-in amplifier 9. The angular frequency of the fixed oscillator 8 is set to the first harmonic angular frequency ω1 of free resonance of the cantilever 2. When the probe 1 comes sufficiently close to the sample 3, the amplitude decreases. This amplitude can be maintained constant by adjusting the Z position of the sample by feeding the output from the lock-in amplifier 9 back to an XYZ drive mechanism 13 using a piezoelectric device that is driven via high cutoff filter 11 and high-voltage amplifier 12 using the feedback circuit 10.

An AC voltage that is obtained as the output from the adder 28 is applied between the probe 1 and the sample 3 as described above. The amplitude and phase of the signal component having the same frequency as a reference signal having a frequency equal to a desired one of the 2ωA±ωB and |ωA±2ωB | obtained by the frequency converter 29 are detected using the lock-in amplifier 17 and supplied to the display device. Consequently, an image 18 of differential capacitance (∂C/∂V) is obtained. The combination of the frequency converter 29 and lock-in amplifier 17 used in the present embodiment can be replaced by a bandpass filter that passes a desired one of angular frequency components 2ωA±ωB and |ωA±2ωB|.

The oscillations of the cantilever 2 induced by electrostatic force are amplified greatly by a resonance phenomenon by setting ωA and ωB in such a way that 2ωA−ωB is coincident with the second harmonic angular frequency (ω2) of free resonance. In consequence, the values of a physical property can be measured with high sensitivity. As an example, it is assumed that the cantilever 2 assumes the form of a short strip, the first harmonic angular frequency ω1 of free resonance is 30 kHz, and the second harmonic angular frequency ω2 is 189 kHz. Let ωA and ωB be equal to 5.189 MHz and 10.189 MHz, respectively. Then, 2ωA−ωB is 189 kHz. The values of a physical property, such as electric capacitance C or dielectric constant e, for high-frequency signals in the megahertz range can be detected by detection of a signal in a lower-frequency range.

The oscillations of the cantilever 2 induced by electrostatic force are amplified greatly by a resonance phenomenon by setting ωA and ωB in such a way that 2ωA−ωB is coincident with the second harmonic angular frequency (ω2) of free resonance. In consequence, the values of a physical property can be measured with high sensitivity. As an example, it is assumed that the cantilever 2 assumes the form of a short strip, the first harmonic angular frequency ω1 of free resonance is 30 kHz, and the second harmonic angular frequency ω2 is 189 kHz. Let ωA and ωB be equal to 5.189 MHz and 10.189 MHz, respectively. Then, 2ωA−ωB is 189 kHz. The values of a physical property, such as electric capacitance C or dielectric constant e, for high-frequency signals in the megahertz range can be detected by detection of a signal in a lower-frequency range.

Figure 11:
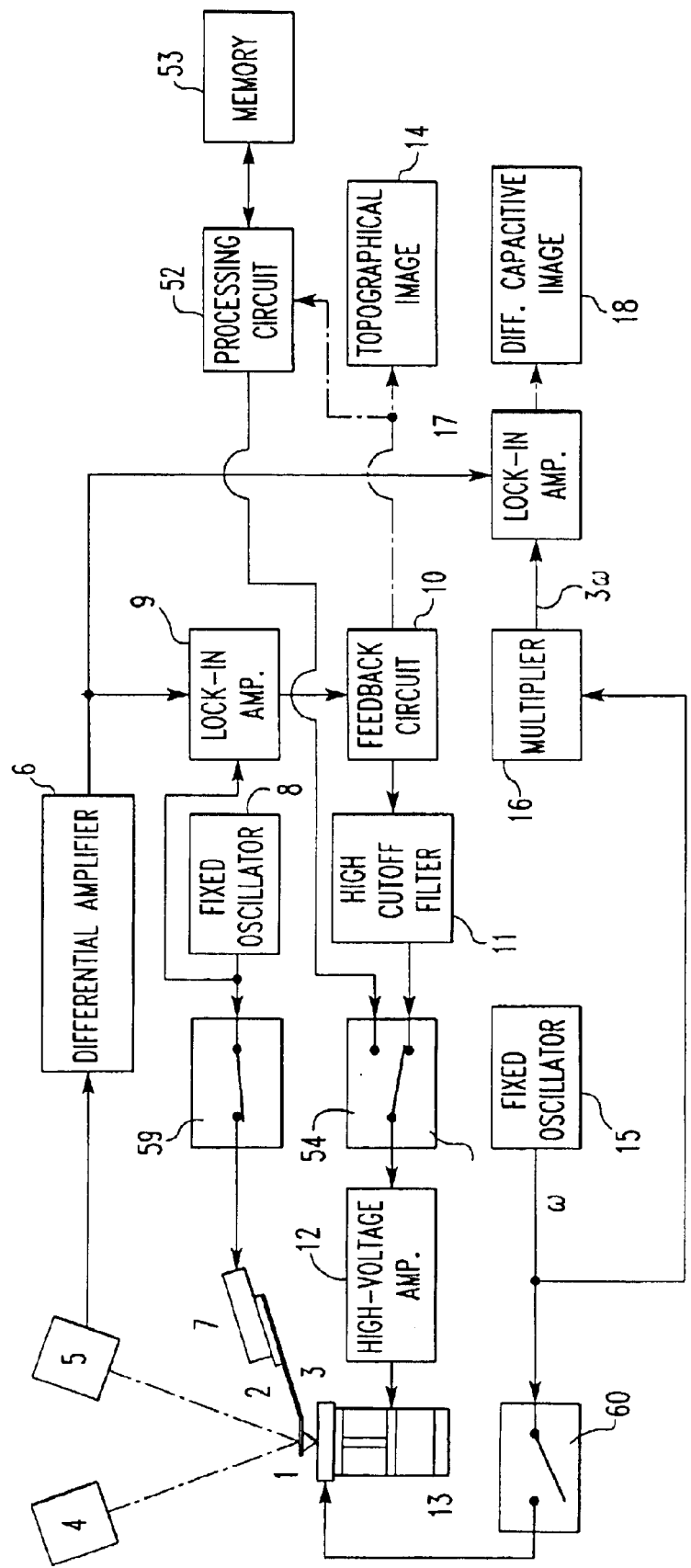
FIG. 11 is a block diagram of a measuring apparatus according to a yet further embodiment of the invention.

FIG. 11 is a block diagram of a measuring apparatus according a further embodiment of the invention. This embodiment is similar to the embodiment illustrated in FIG. 1. Those components which correspond to their respective counterparts of FIG. 1 are denoted by the same reference numerals as in FIG. 1. It is to be noted that this embodiment has a processing circuit 52 realized by a microcomputer. The outputs from the feedback circuit 10 and lock-in amplifier 17 are fed to this processing circuit 52. The processing circuit 52 controls the operation of the high-voltage amplifier 12 via a selector switch 54. This switch 54 switches the signal supplied to the high-voltage amplifier 12 between the output from the high cutoff filter 11 and the output from the processing circuit 52. A memory 53 is connected with the processing circuit 52. Another switch 59 is interposed between the fixed oscillator 8 and piezoelectric device 7. A further switch 60 is inserted between the fixed oscillator 15 and the sample 3. These switches 54, 59, and 60 are turned on and off under control of the processing circuit 52.

Figure 12A:
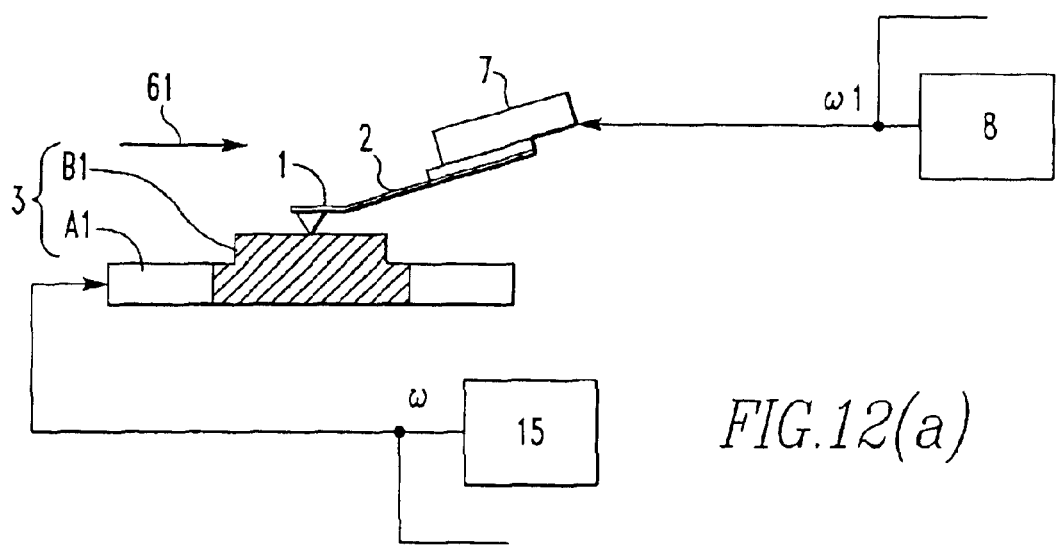
FIGS. 12(a)–12(d) are views illustrating the operation of the apparatus shown in FIG. 11.
Figure 12B:
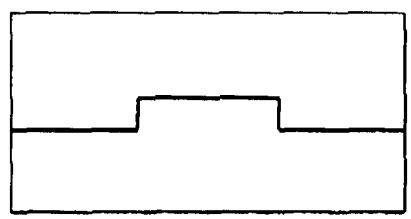
Figure 12C:
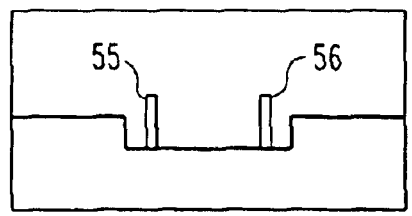

FIGS. 12(a)–12(d) are views illustrating the operation of the embodiment illustrated in FIG. 11. A case similar to the embodiment of FIG. 1 is now considered. That is, the probe 1 is scanned while maintaining constant the interaction between the probe 1 and the sample 3. Thus, the surface topography is measured. At the same time, information about the values of a physical property, such as an image of differential capacitance ($\partial C/\partial V$), is obtained. As shown in FIG. 12(a), sample 3 has portions A1 and B1 which differ in the value of a physical property on its surface. The probe 1 is scanned on the sample 3 as indicated by the arrow 61. The topography of the sample surface is measured. At the same time, the value of a physical property is measured. As a result, a normal image of the surface topography, as shown in FIG. 12(b), is derived. In some cases, an inaccurate image containing information about the distribution of the values of a physical property, as shown in FIG. 12(c), may be obtained. That is, as the surface topography varies, as shown in FIG. 12(c), signals 55 and 56 independent of the distribution of the correct values of a physical property of the sample surface may be obtained as a distribution of the physical property values.

In the present embodiment, the surface topography of the sample is first measured. Information about the obtained topography is recorded. Then, the probe is again scanned along a trajectory at a predetermined distance from the sample surface according to the recorded information about the surface topography. The value of a physical property is also measured. In this way, information about the physical property values is obtained without being affected by the surface topography. The procedure is next described.

Figure 13:
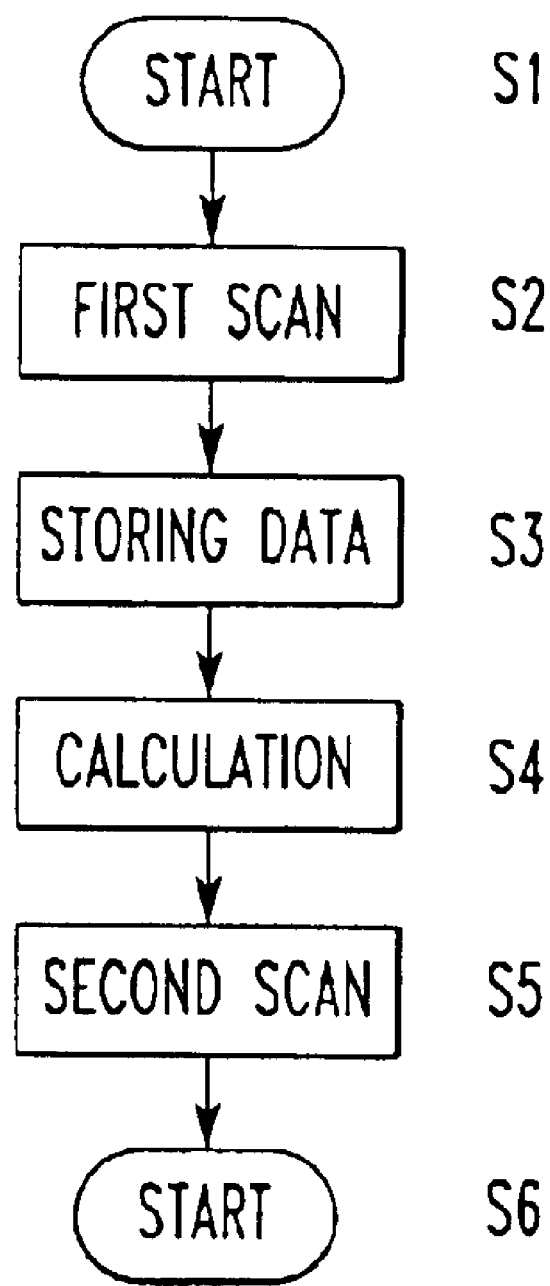
FIG. 13 is a flow chart illustrating the operation of a processing circuit 52 in the apparatus shown in FIG. 11.
Figure 14:
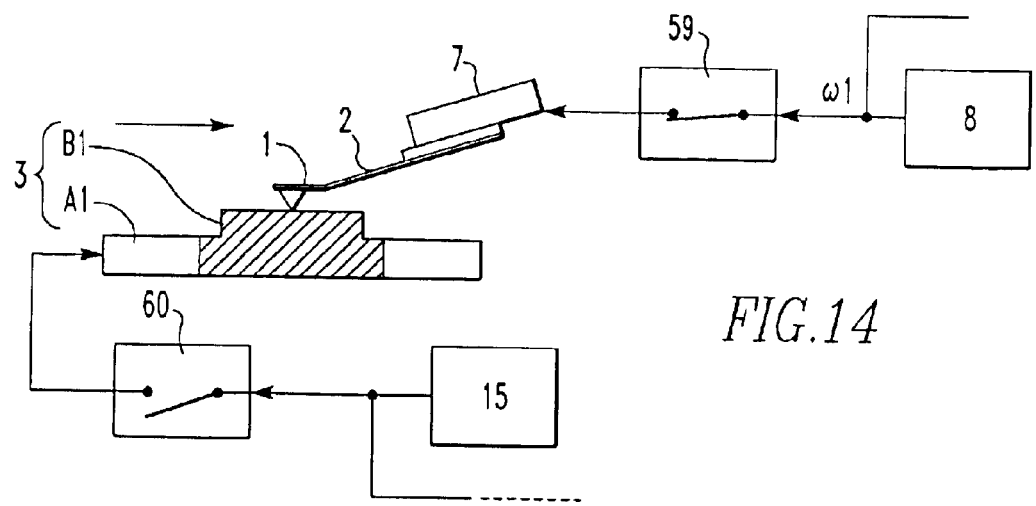
FIG. 14 is a view illustrating the operation of the first scan of the apparatus shown in FIG. 11 in step S2 illustrated in FIG. 13.

FIG. 13 is a flowchart illustrating the operation of the processing circuit 52 in the embodiment shown in FIG. 11. The switch 54 shown in FIG. 11 has been previously switched to the output side of the high cutoff filter 11. Control proceeds from step S1 to S2, where the switch 59 is first turned ON and the switch 60 is turned OFF as shown in FIG. 14. The cantilever 2 is oscillated at the angular resonant frequency $\omega 1$ by the fixed oscillator 8. The surface topography of the sample 3 is measured. In step S3, data about the surface topography obtained from the feedback circuit 10 is stored in the memory 53.

Figure 12D:
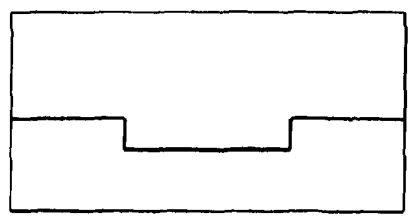
Figure 15:
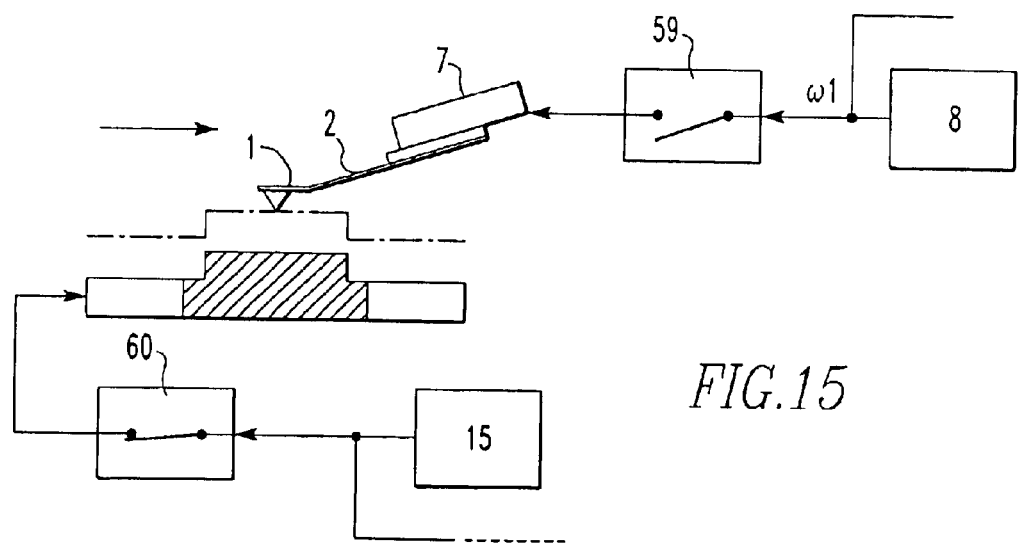
FIG. 15 is a view illustrating the operation of the second scan of the apparatus shown in FIG. 11 in step S5 illustrated in FIG. 13.

Then, in step S4, a predetermined distance L1 is added to or subtracted from the data about the surface topography. In step S5, the switch 54 of FIG. 11 is switched to the output side of the processing circuit 52. As shown in FIG. 15, the switch 59 is turned OFF and the switch 60 is turned ON. Under this condition, a second scan is made to measure the values of a physical property. At this time, the high-voltage amplifier 12 is controlled according to the results of the calculation performed in step S4. Consequently, the probe 1 is moved along the surface topography of the sample. Therefore, the distance between the sample and the probe is maintained constant at all times. Under this condition, the values of a physical property are measured. In the embodiment of FIG. 11, signals 55 and 56 independent of the distribution of values of a physical property are not contained as shown in FIG. 12(d). Thus, correct information about the distribution of only values of a physical property is obtained.

Figure 16:
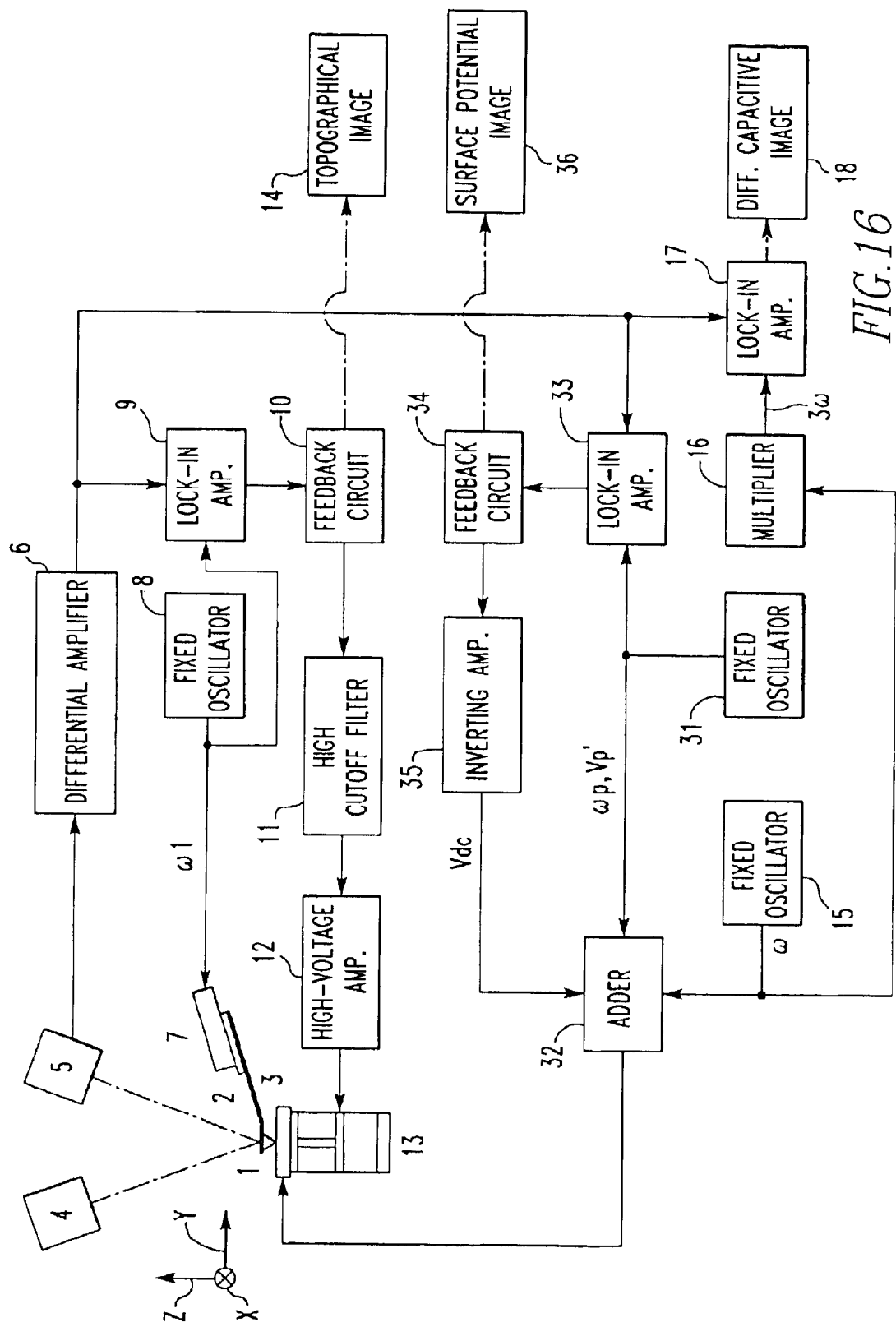
FIG. 16 is a block diagram of a measuring apparatus according to a still further embodiment of the invention.

FIG. 16 is a block diagram showing the structure of a measuring apparatus according to a yet additional embodiment of the invention. The present embodiment is similar to the embodiment already described in connection with FIG. 1, and those components which correspond to their respective counterparts of FIG. 1 are indicated by the same reference numerals as in FIG. 1. The present embodiment is characterized in that electrostatic force acting between the probe 1 and the sample 3 is canceled to thereby obtain information about the work functions of the probe 1 and sample 3. An AC voltage Vp of angular frequency $\omega p$ produced by the fixed oscillator 31 is added to the output voltage Vdc from an inverting amplifier 35 by the adder 32 and applied to the sample 1. Where the probe 1 and sample 3 differ in material, there is a voltage Vcpd that is a work function difference. The electrostatic force is given by $$F = -\frac{1}{2}\frac{\partial C}{\partial z}V^2 = -\frac{1}{2}\frac{\partial C}{\partial z}(V_{cpd} + V_{dc} + V_p\cos\omega_p t)^2 = \qquad (12)$$
$$-\frac{1}{2}\frac{\partial C}{\partial z}[(V_{cpd} + V_{dc})^2 +$$
$$2(V_{cpd} + V_{dc})V_p\cos\omega_p t + V_p^2\cos^2\omega_p t]$$

The components of the angular frequency $\omega p$ are detected by the lock-in amplifier 33. The voltage $V_{dc}$ that satisfies the relation $$V_{cpd} + V_{dc} = 0 \qquad (13)$$

can be adjusted using the feedback circuit 34 and inverting amplifier 35. At this time, we have $$V_{dc} = -V_{cpd} \qquad (14)$$

The difference in work function between the probe 1 and sample 3 is canceled out. The voltage required for this cancellation is imaged. Consequently, a surface potential image 36 can be obtained.

An AC voltage of the angular frequency $\omega$ from the fixed oscillator 15 is applied between the probe 1 and sample 3 through the adder 32. A reference signal is produced by multiplying the angular frequency $\omega$ using the multiplier 16. The third harmonic ($3\omega$) component of electrostatic force synchronized to the reference signal is detected using the lock-in amplifier 17. Thus, an image 18 of differential capacitance ($\partial C/\partial V$) is obtained. The combination of the multiplier 16 and lock-in amplifier 17 used in the present embodiment can be replaced by a bandpass filter that passes the component of the angular frequency $3\omega$.

The oscillations of the cantilever 2 induced by electrostatic force are amplified greatly by a resonance phenomenon by setting the angular frequency $\omega$ in such a way that $3\omega$ is coincident with the second harmonic angular frequency $\omega 2$ of free resonance of the cantilever 2 ($\omega 2 = 3\omega$), in the same way as in the embodiment illustrated in FIG. 1. In consequence, the values of a physical property can be measured with high sensitivity.

It is to be understood that the present invention is not limited to the above embodiments but can be modified variously. For example, where the instrument is so designed that the factor of multiplication of the multiplier can be switched also to 2, the mode of operation can be switched to a mode in which measurements of the values of physical properties based on the second harmonic as proposed heretofore can be carried out.

In the above embodiments, the sample is driven in making scans. The probe may be moved relative to the sample. In summary, one of the probe and sample may be moved relative to the other.

Furthermore, in the above embodiments, the Z position of the sample is varied by the drive mechanism 13 to thereby adjust the distance between the sample and probe. Instead, the Z position of the probe may be varied.

What is claimed is:

1. Measuring apparatus for measuring values of a physical property of a sample by placing a probe close to or in contact with the sample, said apparatus comprising:

at least one oscillator for applying an AC voltage of angular frequency $\omega$ between the probe and sample;

force detection means for detecting a force produced by interaction between the probe and sample; and harmonic component extraction means for extracting a harmonic component $n \times \omega$ ($n \geq 3$) contained in an output from the force detection means, wherein said force detection means detects a tunneling current.

2. Measuring apparatus for measuring values of a physical property of a sample by placing a probe close to or in contact with the sample, said apparatus comprising:

at least one oscillator for approving an AC voltage of angular frequency $\omega$ between the probe and sample;

force detection means for detecting a force produced by interaction between the probe and sample; and harmonic component extraction means for extracting a harmonic component $n \times \omega$ ($n \geq 3$) contained in an output from the force detection means, wherein said at least one oscillator consists of plural oscillators producing signals of different frequencies, and wherein there is further provided adder means for producing an output signal that is a sum of the signals from the oscillators, said output signal being applied between the probe and said sample.

3. Measuring apparatus for measuring values of a physical property of a sample by placing a probe close to or in contact with the sample, said apparatus comprising:

at least one oscillator for applying an AC voltage of angular frequency $\omega$ between the probe and sample;

force detection means for detecting a force produced by interaction between the probe and sample; and harmonic component extraction means for extracting a harmonic component $n \times \omega$ ($n \geq 3$) contained in an output from the force detection means, further comprising:

a cantilever for holding said probe;

a piezoelectric device for oscillating said cantilever;

a moving mechanism for varying the distance between the probe and the sample;

a scanning mechanism for moving the probe and sample relative to each other such that the probe is scanned in X- and Y-directions along a surface of the sample;

a deflection sensor for detecting deflections of the cantilever optically;

a feedback circuit for creating a feedback signal based on an output signal from the deflection sensor, the feedback signal being fed back to said moving mechanism;

a memory for storing the feedback signal as topographic data about topography of the surface of the sample, the feedback signal being obtained when a scan is made by said scanning mechanism; and control means for reading the topographic data from said memory in association with the scan made by said scanning mechanism, supplying the read topographic data to said moving mechanism instead of said feedback signal, and controlling said harmonic component extraction means to extract the harmonic component $n \times \omega$ ($n \geq 3$), and wherein said force detection means detects an interatomic force.

4. Measuring apparatus for measuring values of a physical property of a sample by placing a probe close to or in contact with the sample, said apparatus comprising:

at least one oscillator for applying an AC voltage of angular frequency $\omega$ between the probe and sample;

force detection means for detecting a force produced by interaction between the probe and sample; and harmonic component extraction means for extracting a harmonic component $n \times \omega$ ($n \geq 3$) contained in an output from the force detection means, further comprising:

a cantilever for holding said probe;

a piezoelectric device for oscillating said cantilever;

a deflection sensor for detecting deflections of the cantilever optically;

a feedback circuit for feeding an output from the deflection sensor back to said piezoelectric device while the probe is kept in contact with the sample and oscillating the cantilever at a contact resonant frequency;

a scanning mechanism for moving the probe and sample relative to each other such that the probe is scanned in X- and Y-directions along a surface of the sample; and frequency detection means for detecting the contact resonant frequency of said probe based on a deflection signal obtained from said deflection sensor, wherein said at least one oscillator for applying an AC voltage of angular frequency $\omega$ between the probe and sample produces the AC voltage based on an output signal from said frequency detection means, and wherein said force detection means detects an interatomic force.

5. A method of measuring values of a physical property, comprising the steps for:

keeping a probe in contact with the surface of a sample;

applying an AC voltage oscillating at an angular frequency of $\omega$ between said probe and said sample to thereby induce an electrostatic force, said angular frequency $\omega$ being so selected that $n \times \omega$ ($n \geq 3$) is coincident with the contact resonant angular frequency $\omega_c$ of the mechanical resonator portion including said probe and said sample; and detecting an electrostatic force oscillating at an angular frequency of $n \times \omega$ ($n \geq 3$), whereby values of the physical property of capacitance C or dielectric constant $\in$ are measured.

6. An apparatus for measuring values of a physical property, comprising:

means for keeping a probe in contact with the surface of a sample;

means for applying an AC voltage oscillating at an angular frequency of $\omega$ between said probe and said sample to thereby induce an electrostatic force, said angular frequency $\omega$ being so selected that $n \times \omega$ ($n \geq 3$)

is coincident with the contact resonant angular frequency $\omega_c$ of the mechanical resonator portion including said probe and said sample; and means for detecting an electrostatic force oscillating at an angular frequency of $n \times \omega$ ($n \geq 3$), whereby values of the physical property of capacitance C or dielectric constant $\epsilon$ are measured.

7. The apparatus according to claim 6, further comprising:

at least one oscillator for applying an AC voltage of angular frequency $\omega$ between the probe and the sample;

force detection means for detecting an interatomic force;

harmonic component extraction means for extracting a harmonic component $n \times \omega$ ($n \geq 3$) contained in an output from the force detection means;

a cantilever for holding said probe;

a piezoelectric device for oscillating said cantilever;

a deflection sensor for optically detecting deflections of the cantilever;

a feedback circuit for feeding an output from the deflection sensor back to said piezoelectric device while the probe is kept in contact with the sample and oscillating the cantilever at a contact resonant frequency;

a scanning mechanism for moving the probe and sample relative to each other such that the probe is scanned in X- and Y-directions along a surface of the sample; and frequency detection means for detecting the contact resonant frequency of said probe based on a deflection signal obtained from said deflection sensor, wherein said at least one oscillator for applying an AC voltage of angular frequency $\omega$ between the probe and sample produces the AC voltage based on an output signal from said frequency detection means.

8. A method of measuring values of a physical property, comprising the steps of:

maintaining constant phase shift or constant frequency shift of a probe at the first harmonic angular frequency $\omega_1$ of the mechanical resonator portion including the probe and the cantilever by feedback controlling a distance between the probe and a sample;

applying an AC voltage oscillating at an angular frequency of $\omega$ between the probe and the sample to thereby induce an electrostatic force, said angular frequency $\omega$ being so selected that $n \times \omega$ ($n \geq 3$) being coincident with the second harmonic angular frequency $\omega_2$ of said mechanical resonator portion including the probe and the cantilever; and detecting an electrostatic force oscillating at an angular frequency of $n \times \omega$ ($n \geq 3$), whereby values of the physical property of capacitance C or dielectric constant $\epsilon$ are measured.

9. An apparatus for measuring values of a physical property, comprising the steps of:

means for maintaining constant phase shift or constant frequency shift of a probe at the first harmonic angular frequency $\omega$ of the mechanical resonator portion including the probe and the cantilever by feedback controlling a distance between the probe and a sample;

means for applying an AC voltage oscillating at an angular frequency of $\omega$ between the probe and the sample to thereby induce an electrostatic force, said angular frequency $\omega$ being so selected that $n \times \omega$ ($n \geq 3$) being coincident with the second harmonic angular frequency $\omega_2$ of said mechanical resonator portion including the probe and the cantilever; and means for detecting an electrostatic force oscillating at an angular frequency of $n \times \omega$ ($n \geq 3$), whereby values of the physical property of capacitance C or dielectric constant $\epsilon$ are measured.

* * * * *

UNITED STATES PATENT AND TRADEMARK OFFICE
CERTIFICATE OF CORRECTION

PATENT NO.     : 6,823,724 B1                                                                    Page 1 of 1
DATED          : November 30, 2004
INVENTOR(S)    : Kobayashi et al.

It is certified that error appears in the above-identified patent and that said Letters Patent is hereby corrected as shown below:

Column 15,
Line 32, "for approving" should read -- for applying --

Column 18,
Line 21, "frequency $\omega$" should read -- frequency $\omega_1$ --

Signed and Sealed this

Tenth Day of May, 2005

JON W. DUDAS
*Director of the United States Patent and Trademark Office*